(12) United States Patent
Slavik

(10) Patent No.: US 7,899,251 B2
(45) Date of Patent: Mar. 1, 2011

(54) BALANCING OUT-OF-DICTIONARY AND IN-DICTIONARY RECOGNITION SCORES

(75) Inventor: Petr Slavik, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 11/446,872

(22) Filed: Jun. 5, 2006

(65) Prior Publication Data

US 2007/0280537 A1 Dec. 6, 2007

(51) Int. Cl.
*G06K 9/00* (2006.01)

(52) U.S. Cl. .......................................... 382/181; 382/187

(58) Field of Classification Search .......................... None
See application file for complete search history.

(56) References Cited

U.S. PATENT DOCUMENTS

| | | | |
|---|---|---|---|
| 3,651,459 A * | 3/1972 | Hahn | 382/231 |
| 5,644,648 A * | 7/1997 | Bose et al. | 382/177 |
| 5,680,511 A * | 10/1997 | Baker et al. | 704/257 |
| 5,710,866 A * | 1/1998 | Alleva et al. | 704/256.4 |
| 5,812,697 A * | 9/1998 | Sakai et al. | 382/186 |
| 5,812,698 A * | 9/1998 | Platt et al. | 382/186 |
| 5,903,668 A | 5/1999 | Beernink | |
| 5,999,902 A * | 12/1999 | Scahill et al. | 704/240 |
| 6,055,333 A * | 4/2000 | Guzik et al. | 382/187 |
| 6,223,155 B1 * | 4/2001 | Bayya | 704/243 |
| 6,393,395 B1 * | 5/2002 | Guha et al. | 704/232 |
| 6,453,070 B1 * | 9/2002 | Seni et al. | 382/187 |
| 6,633,672 B1 * | 10/2003 | Guzik et al. | 382/189 |
| 6,677,932 B1 * | 1/2004 | Westerman | 345/173 |
| 6,718,060 B1 * | 4/2004 | Yokota et al. | 382/187 |
| 6,724,936 B1 * | 4/2004 | Riemer | 382/186 |
| 6,735,562 B1 * | 5/2004 | Zhang et al. | 704/240 |
| 6,850,885 B2 * | 2/2005 | Raddino et al. | 704/236 |
| 6,970,877 B2 * | 11/2005 | Rowley et al. | 1/1 |
| 7,158,678 B2 * | 1/2007 | Nagel et al. | 382/228 |
| 7,228,275 B1 * | 6/2007 | Endo et al. | 704/235 |
| 7,293,231 B1 * | 11/2007 | Gunn et al. | 345/179 |
| 7,336,827 B2 * | 2/2008 | Geiger et al. | 382/186 |
| 7,421,417 B2 * | 9/2008 | Mangasarian et al. | 706/20 |
| 2001/0018654 A1 * | 8/2001 | Hon et al. | 704/257 |
| 2003/0007018 A1 * | 1/2003 | Seni et al. | 345/864 |

(Continued)

OTHER PUBLICATIONS

Yaeger et al., "Combining Neural Networks and Context-Driven Search for On-Line, Printed Handwriting Recognition in the Newton", 1998, http://www.beanblossom.in.us/larryy/Yaegeretal.AIMag.pdf.

(Continued)

*Primary Examiner* — Yubin Hung
*Assistant Examiner* — Avinash Yentrapati

(57) ABSTRACT

Various technologies and techniques are disclosed that improve handwriting recognition operations. A balancing factor is calculated that can be used in recognition mode to compare out-of-dictionary recognition scores with in-dictionary recognition scores. Correct ink samples of words are provided, with some in-dictionary and some out-of-dictionary words. One or more tuning sets are generated from the samples, the tuning set(s) having a percentage of out-of-dictionary words based upon what is expected for a typical user. A handwriting recognizer is run against the tuning set(s) to determine statistics. The statistics are based upon the recognized answer for each word compared to the correct answer. The statistics are used to calculate the balancing factor. During recognition mode, a user inputs handwriting to be recognized. The balancing factor is used to compare and combine an in-dictionary alternate list with an out-of-dictionary alternate list to reach a recognition decision.

15 Claims, 9 Drawing Sheets

U.S. PATENT DOCUMENTS

| | | | |
|---|---|---|---|
| 2003/0086612 A1* | 5/2003 | Hullender | 382/187 |
| 2003/0110038 A1* | 6/2003 | Sharma et al. | 704/270 |
| 2004/0002940 A1* | 1/2004 | Meek et al. | 707/1 |
| 2004/0002986 A1* | 1/2004 | Rowley et al. | 707/101 |
| 2004/0006468 A1* | 1/2004 | Gupta et al. | 704/254 |
| 2004/0140956 A1* | 7/2004 | Kushler et al. | 345/168 |
| 2005/0049985 A1* | 3/2005 | Mangasarian et al. | 706/45 |
| 2005/0074169 A1* | 4/2005 | Filatov et al. | 382/229 |
| 2005/0129313 A1* | 6/2005 | Hullender | 382/187 |
| 2005/0256712 A1* | 11/2005 | Yamada et al. | 704/255 |
| 2005/0289140 A1* | 12/2005 | Ford et al. | 707/5 |
| 2006/0020461 A1* | 1/2006 | Ogawa | 704/251 |
| 2006/0190259 A1* | 8/2006 | Jeong et al. | 704/256 |
| 2007/0005356 A1* | 1/2007 | Perronnin | 704/245 |
| 2007/0005537 A1* | 1/2007 | Abdulkader et al. | 706/20 |
| 2007/0050191 A1* | 3/2007 | Weider et al. | 704/275 |
| 2008/0215301 A1* | 9/2008 | Eyal et al. | 703/11 |
| 2009/0276705 A1* | 11/2009 | Ozdemir et al. | 715/708 |

OTHER PUBLICATIONS

Safabakhsh et al., "Nastaaligh Handwritten Word Recognition Using a Continuous-Density Variable-Duration Hmm", Apr. 2005, vol. 30, http://www.kfupm.edu.sa/publications/ajse/articles/301B_07P.pdf.

* cited by examiner

BALANCING OUT-OF-DICTIONARY AND IN-DICTIONARY RECOGNITION SCORES

BACKGROUND

Pen-enabled devices such as tablet pc's and personal digital assistants often use one or more types of handwriting recognizers to allow users to enter data using the pen. Handwriting recognizers analyze the user's handwriting according to a series of rules to determine the most likely match. Typically, the ink segments are compared to ink samples in a database to determine a list of probabilities of the most likely results. Most recognizers also use language models and/or dictionaries to further improve recognition results.

One way to assure that words that do not follow the rules of the language model or are not in the dictionary can still be recognizer is to use two different modules—in-dictionary module and out-of-dictionary module—each producing their own list of best matching results. The merging of these lists into one list of alternates presents a significant difficulty.

SUMMARY

Various technologies and techniques are disclosed that improve handwriting recognition operations. During training mode, a balancing factor is calculated that can later be used in recognition mode to compare out-of-dictionary recognition scores with in-dictionary recognition scores. A training set of correct ink samples of words is provided, with some in-dictionary words and some out-of-dictionary words. One or more tuning sets are generated from the correct ink samples, and the tuning set(s) have a percentage of out-of-dictionary words based upon what is expected for a typical user. A handwriting recognizer is run against the tuning set(s) to determine a set of statistics. The statistics are based upon the recognized answer for each of the words compared to the correct answer. The statistics are used to calculate the balancing factor. Later, during recognition mode, a user inputs handwriting to be recognized. The balancing factor is used to compare and combine an in-dictionary alternate list with an out-of-dictionary alternate list to reach a recognition decision.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
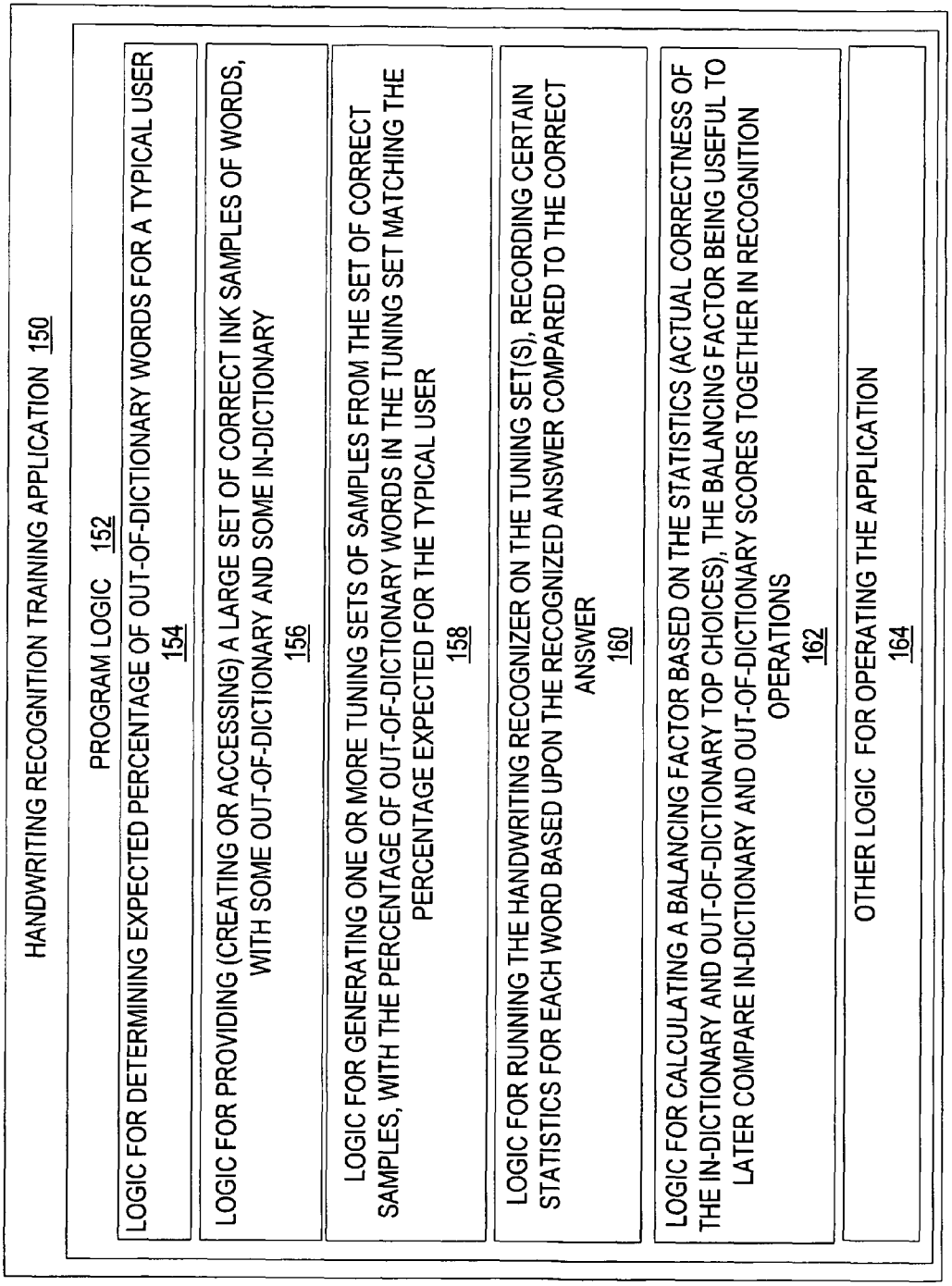
FIG. 1 is a diagrammatic view of a handwriting recognition training application of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that improves handwriting recognition, but the system also serves other purposes in addition to these. In one implementation, one or more of the techniques described herein can be implemented as features within a handwriting recognition application, or from any other type of program or service that includes a handwriting recognition feature. In one implementation, some of the techniques discussed herein are performed during a training mode before the handwriting recognition application is shipped to an end user. In another implementation, some of the techniques discussed herein are performed during a recognition mode being initiated by an end user of the handwriting recognition application. In other implementations, some, all, or additional techniques to those discussed herein are performed at various times during a training mode and/or a recognition mode of a handwriting recognition application.

Turning now to FIG. 1, handwriting recognition training application 150 operating on a computing device (such as 600 on FIG. 9) is illustrated. In one implementation, handwriting recognition training application 150 is used by a recognizer developer or other user to train a handwriting recognition system prior to use by an end user. In one implementation, handwriting recognition training application 150 is one of the application programs that reside on computing device. However, it will be understood that handwriting recognition training application 150 can alternatively or additionally be embodied as computer-executable instructions on one or more computers and/or in different variations. Alternatively or additionally, one or more parts of handwriting recognition training application 150 can be part of system memory (604 on FIG. 9), on other computers and/or applications (615 on FIG. 9), or other such variations as would occur to one in the computer software art.

Handwriting recognition training application 150 includes program logic 152, which is responsible for carrying out some or all of the techniques described herein. Program logic 152 includes logic for determining expected percentage of out-of-dictionary words for a typical user 154; logic for providing (creating or accessing) a large set of correct ink samples of words, with some out-of-dictionary and some in-dictionary 156; logic for generating one or more tuning sets of samples from the set of correct samples, with the percentage of out-of-dictionary words in the tuning set(s) matching the percentage expected for the typical user 158; logic for running the handwriting recognizer on the tuning set(s), recording certain statistics for each word based upon the recognized answer compared to the correct answer 160; logic for calculating a balancing factor based on the statistics (actual correctness of the in-dictionary and out-of-dictionary top choices), the balancing factor being useful to compare in-dictionary and out-of-dictionary scores together in recognition operations 162; and other logic for operating the application 168. In one implementation, program logic 152 is operable to be called programmatically from another program, such as using a single call to a procedure in program logic 152.

Figure 2:
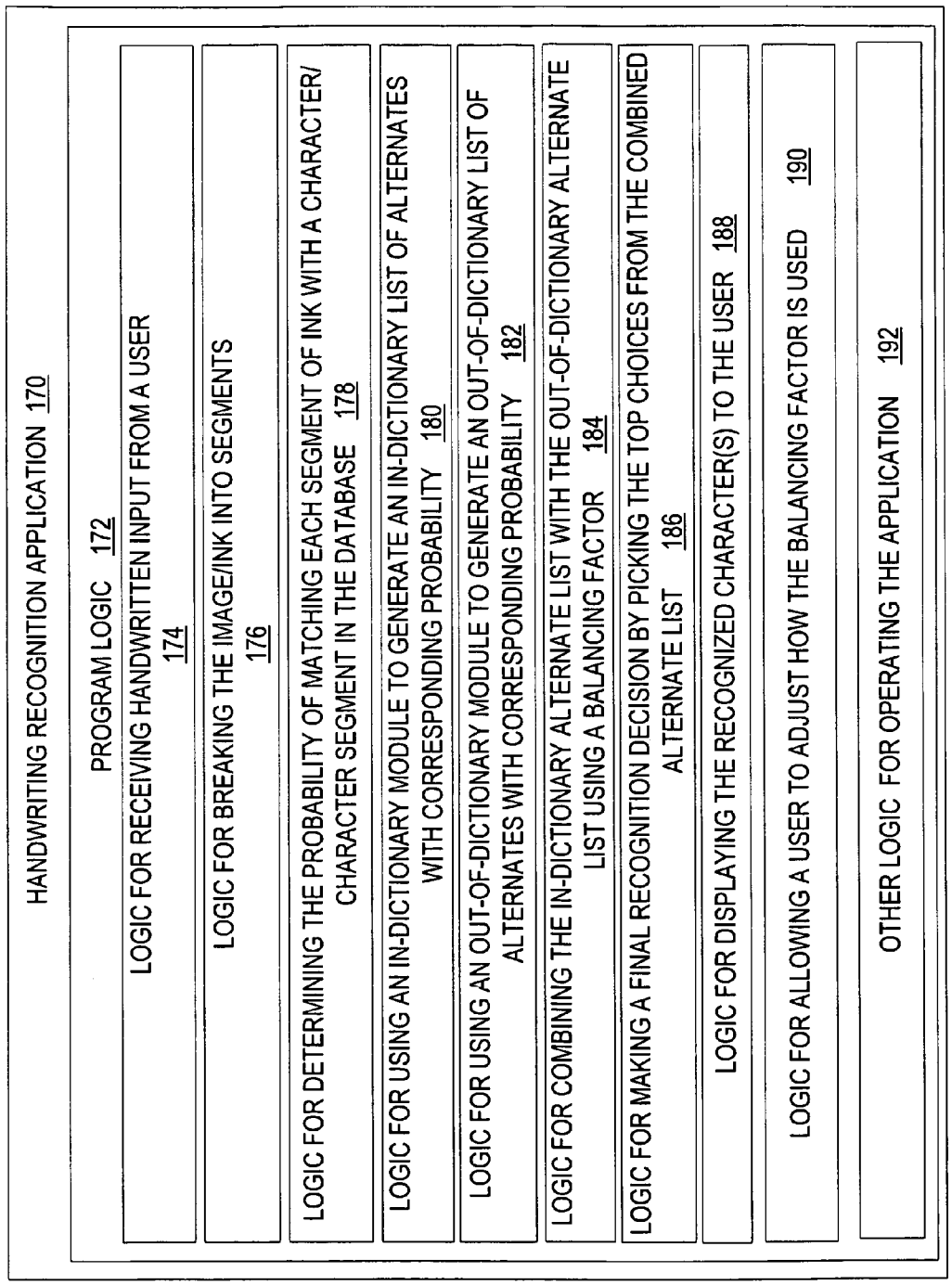
FIG. 2 is a diagrammatic view of a handwriting recognition application of one implementation.
Figure 9:
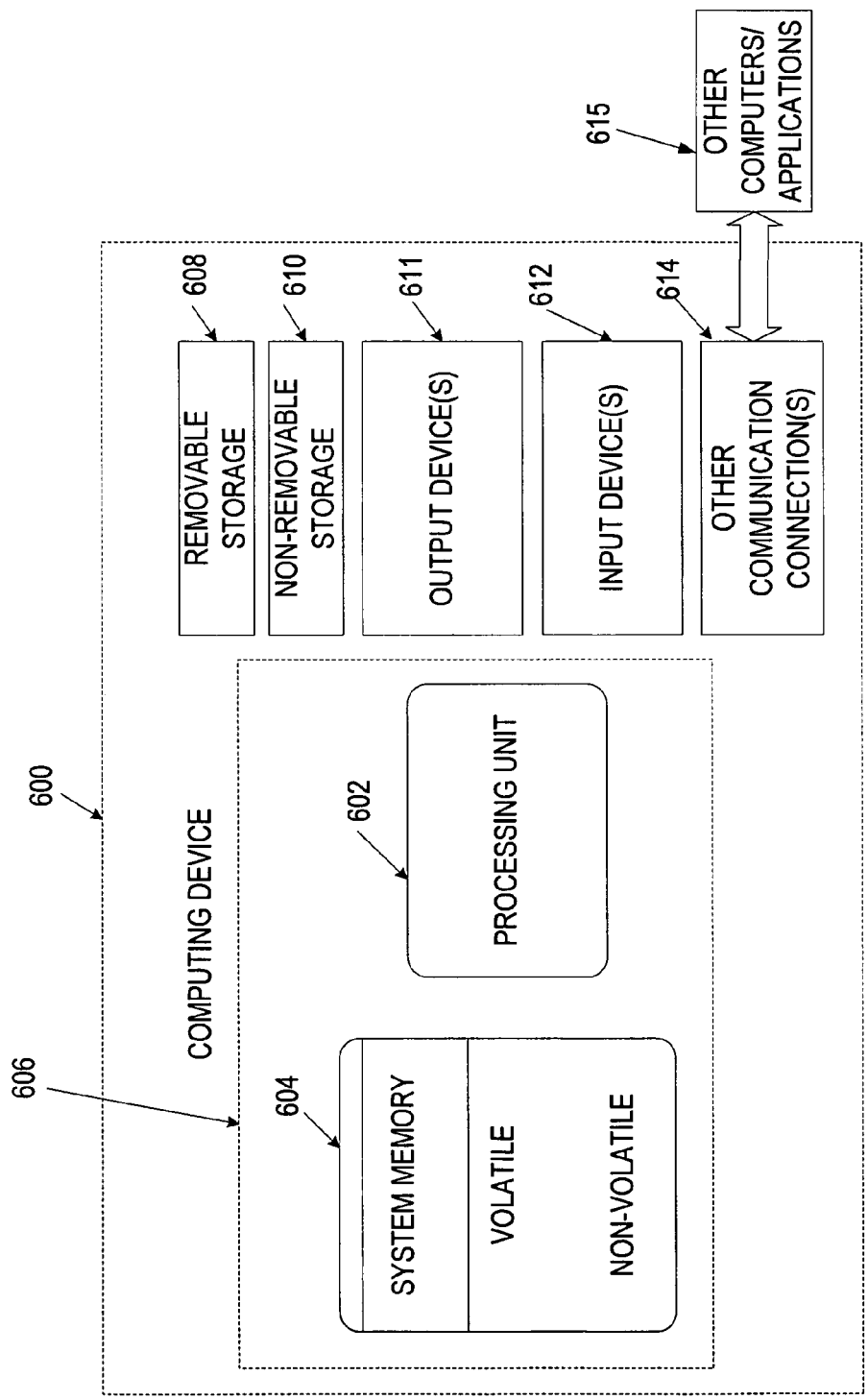
FIG. 9 is a diagrammatic view of a computer system of one implementation.

FIG. 2 is one implementation of a handwriting recognition application 170 operating on a computing device (such as 600 on FIG. 9). In one implementation, handwriting recognition application 170 is used by an end user for handwriting recognition operations (e.g. to input handwritten input and have it recognized by handwriting recognition application 170). Handwriting recognition application 170 is one of the application programs that reside on a different computing device or the same computing device described with respect to handwriting recognition training application 150 of FIG. 1. It will be understood that handwriting recognition application 170 can alternatively or additionally be embodied as computer-executable instructions on one or more computers and/or in different variations. Alternatively or additionally, one or more parts of handwriting recognition training application 170 can be part of system memory (604 on FIG. 9), on other computers and/or applications (615 on FIG. 9), or other such variations as would occur to one in the computer software art.

Handwriting recognition application 170 includes program logic 172, which is responsible for carrying out some or all of the techniques described herein. Program logic 172 includes logic for receiving handwritten input from a user 174; logic for breaking the image/ink into segments 176; logic for determining the probability of matching each segment of ink with a character/character segment in the database 178; logic for using an in-dictionary module to generate and in-dictionary list of alternates with corresponding probability 180; logic for using an out-of-dictionary module to generate an out-of-dictionary list of alternates with corresponding probability 182; logic for combining the in-dictionary alternate list with the out-of-dictionary alternate list using a balancing factor 184; logic for making a final recognition decision by picking the top choices from the combined alternate list 186; logic for displaying the recognized character(s) to the user 188; logic for allowing a user to adjust how the balancing factor is used in recognition operations 190; and other logic for operating the application 192. In one implementation, program logic 172 is operable to be called programmatically from another program, such as using a single call to a procedure in program logic 172.

Figure 3:
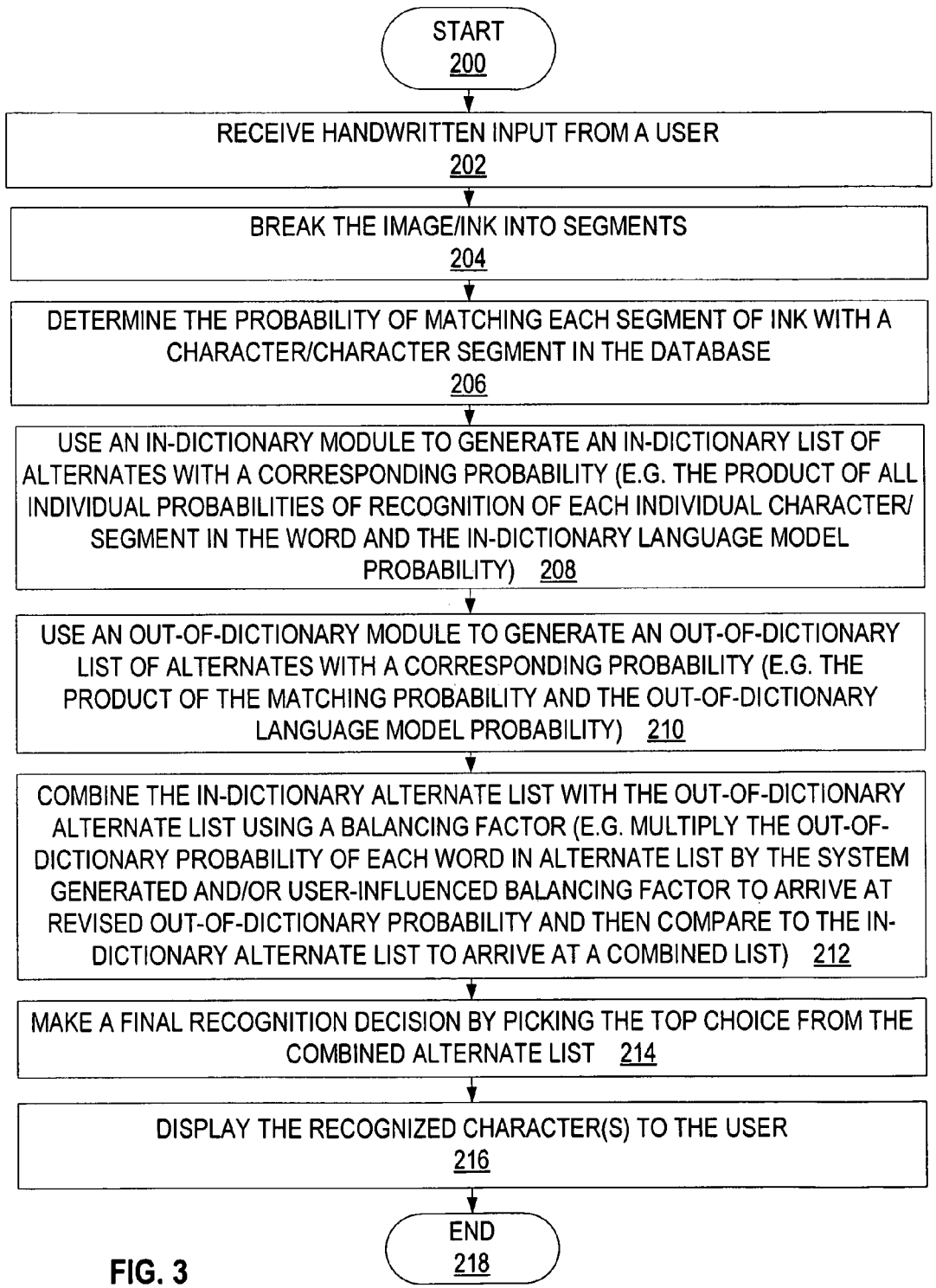
FIG. 3 is a high-level process flow diagram for one implementation of the system of FIG. 2.

Turning now to FIGS. 3-7 with continued reference to FIGS. 1-2, the stages for implementing one or more implementations of handwriting recognition training application 150 and/or handwriting recognition application 170 are described in further detail. FIG. 3 is a high level process flow diagram for one implementation of handwriting recognition application 170 of FIG. 2. In one form, the process of FIG. 3 is at least partially implemented in the operating logic of computing device 600 (on FIG. 9). The procedure begins at start point 200 with receiving handwritten input from a user (stage 202). The image/ink of the user's handwritten input is broken into segments (stage 204), and the probability of matching each segment of ink with a character/character segment in the database is determined (stage 206). An in-dictionary module is used to generate an in-dictionary list of alternates with a corresponding probability (e.g. the product of all individual probabilities of recognition of each individual character/segment in the word and the in-dictionary language model probability) (stage 208). An out-of-dictionary module is used to generate an out-of-dictionary list of alternates with a corresponding probability (e.g. the product of the matching probability and the out-of-dictionary language model probability) (stage 210).

The in-dictionary alternate list is combined with the out-of-dictionary alternate list using a balancing factor (stage 212). The balancing factor can be system generated and/or user-influenced by a customization setting. In one implementation, the out-of-dictionary probability of each item in alternate list is multiplied by the balancing factor and then compared to the in-dictionary alternate list (stage 212). The system makes a final recognition decision by picking the top choice from the combined alternate list (stage 214) and then displays the recognized character(s) to the user (stage 216). The process then ends at end point 218.

Figure 4:
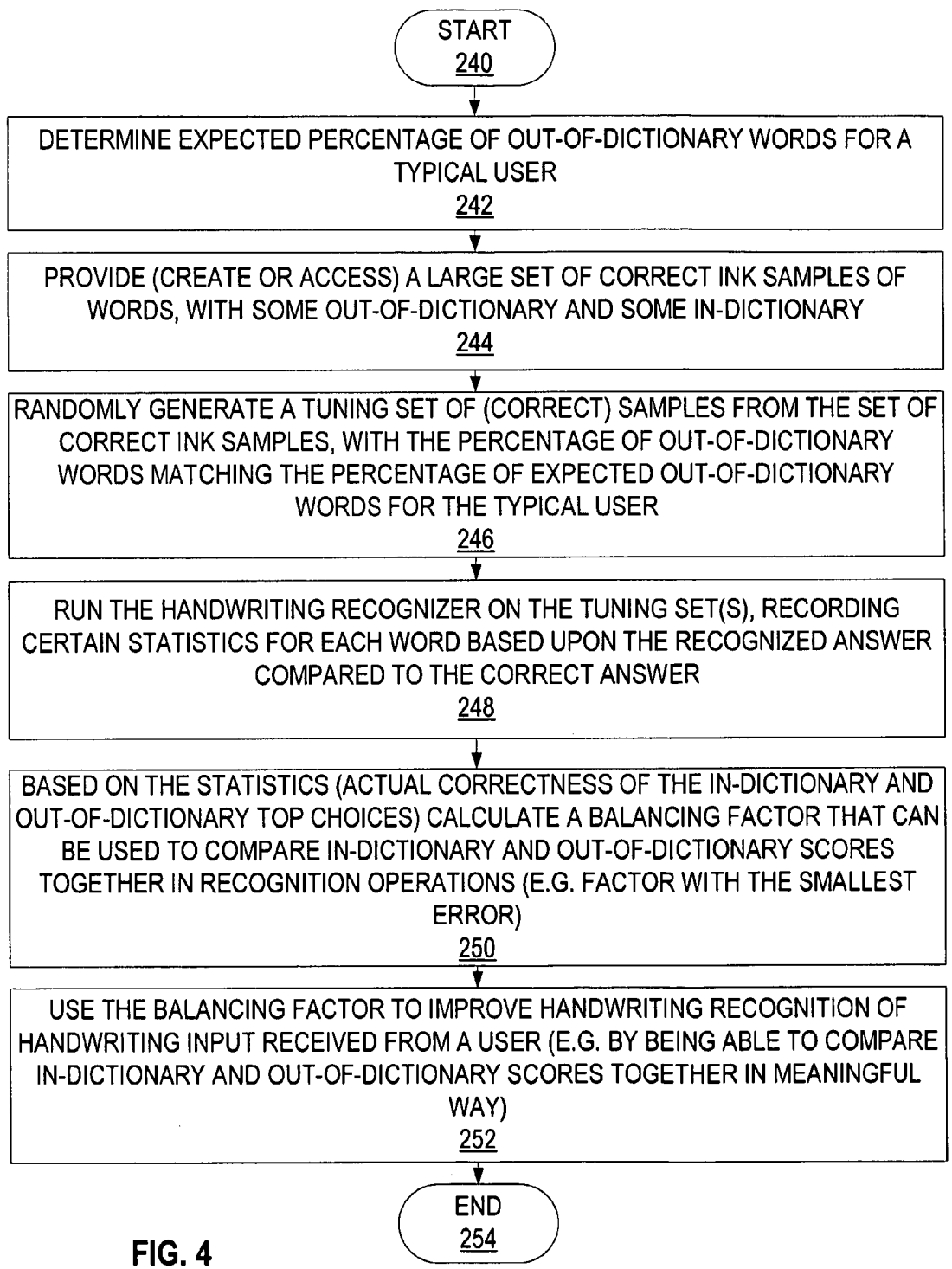
FIG. 4 is a process flow diagram for one implementation of the system of FIG. 1 illustrating the high level stages involved in calculating a balancing factor that can be used to compare in-dictionary and out-of-dictionary scores together.

FIG. 4 illustrates one implementation of the system of FIG. 1 illustrating the high level stages involved in calculating a balancing factor that can be used to compare in-dictionary and out-of-dictionary scores together. The calculation would typically be done during the training phase of the handwriting application. In one form, the process of FIG. 4 is at least partially implemented in the operating logic of computing device 600 (of FIG. 9). The procedure begins at start point 240 with determining the expected percentage of out-of-dictionary words for a typical user (stage 242). A large set of correct ink samples of words is provided (e.g. created and/or accessed), with some out-of-dictionary and some in-dictionary samples (stage 244). One or more tuning sets of (correct) samples are generated (e.g. randomly) from the set of correct ink samples with the percentage of out-of-dictionary words matching the percentage of expected out-of-dictionary words for the typical user (stage 246).

In one implementation, just one balancing factor is used, and thus just one tuning set is needed. In another implementation, a user is able to adjust the balancing factor later based on a desired preference weight to be given to out-of-dictionary words versus in-dictionary words. In such a scenario, multiple tuning sets are used to generate different balancing factors for the different percentages that might be specified by the user for out-of-dictionary versus in-dictionary emphasis. This scenario is described in further detail in FIG. 8. Other variations are also possible that use one or more tuning sets as part of the process or arriving at one or more balancing factors.

The handwriting recognizer is run on the tuning set(s), and certain statistics are recorded for each word based upon the recognized answer compared to the correct answer (stage 248). Based on the statistics (actual correctness of the in-dictionary and out-of-dictionary top choices), a balancing factor is calculated that can be used to compare in-dictionary and out-of-dictionary scores together in recognition operations (e.g. balancing factor with the smallest error) (stage 250). The balancing factor is used by handwriting recognition application 170 to improve handwriting recognition of handwriting input received from a user (e.g. by being able to compare in-dictionary and out-of-dictionary scores together in a meaningful way) (stage 252). The process ends at end point 254.

Figure 5:
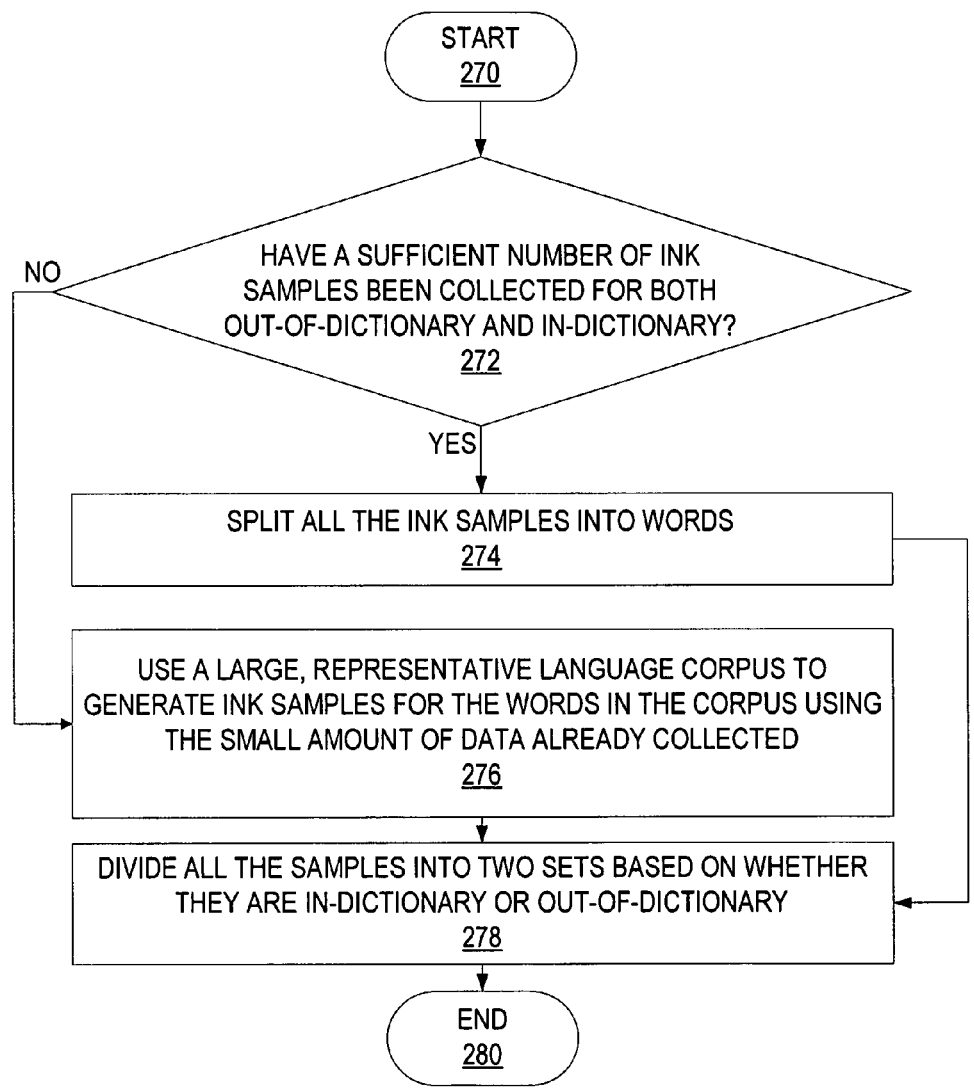
FIG. 5 is a process flow diagram for one implementation of the system of FIG. 1 illustrating the stages involved in creating a large set of correct ink samples that includes some out-of-dictionary and in-dictionary.

FIG. 5 is one implementation of the system of FIG. 1 illustrating the stages involved in creating a large set of correct ink samples that includes some out-of-dictionary and in-dictionary words. In one form, the process of FIG. 5 is at least partially implemented in the operating logic of computing device 600 (of FIG. 9). The procedure begins at start point 270 with determining whether a sufficient number of ink samples been collected for both out-of-dictionary and in-dictionary (decision point 272). If enough samples have been collected for both out-of-dictionary and in-dictionary (decision point 272), then all the ink samples are split into words (stage 274). The words are then divided into two sets based on whether they are in-dictionary or out-of-dictionary (stage 278). The process then ends at end point 280.

If enough samples have not been collected for both out-of-dictionary and in-dictionary (decision point 272), then a large, representative language corpus is used to generate ink samples for the words in the corpus using the small amount of data already collected (stage 276). All the samples are then divided into two sets based on whether they are in-dictionary or out-of-dictionary (stage 278). The process ends at end point 280.

Figure 6:
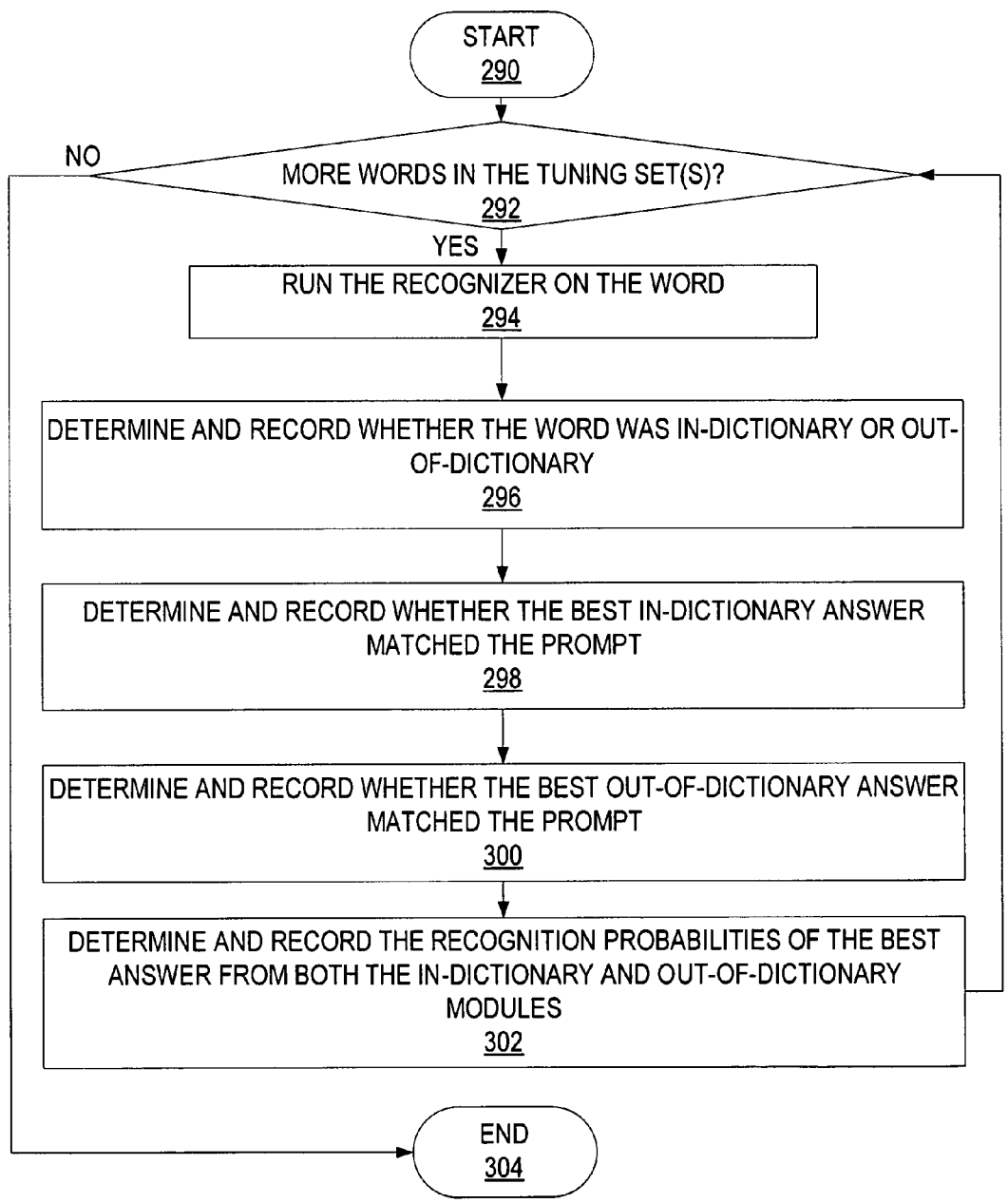
FIG. 6 is a process flow diagram for one implementation of the system of FIG. 1 illustrating the stages involved in running the handwriting recognizer on one or more tuning sets to generate certain statistics.

FIG. 6 is one implementation of the system of FIG. 1 illustrating the stages involved in running the handwriting recognizer on one or more tuning sets to generate certain statistics. In one form, the process of FIG. 6 is at least partially implemented in the operating logic of computing device 600 (of FIG. 9). The procedure begins at start point 290 with determining whether there are more words in the tuning set(s) (decision point 292), since various steps are performed for each word in the tuning set(s). The recognizer is run on the current word in the tuning set(s) (stage 294). The system determines and records whether the word was in-dictionary or out-of-dictionary (stage 296). The system determines and records whether the best in-dictionary answer matched the prompt (stage 298). The system determines and records whether the best out-of-dictionary answer matched the prompt (stage 300). The system determines and records the recognition probabilities of the best answer from both the in-dictionary and the out-of-dictionary modules (stage 302).

In one implementation, the probability coming from the in-dictionary module is the probability of Ink match times the probability of the word as given by the in-dictionary model. Similarly, the probability coming from the out-of-dictionary module is the probability of Ink match times the probability of the word as given by the out-of-dictionary language model (sometimes called the weak language model). Other variations for calculating the probabilities from the in-dictionary module and/or the out-of-dictionary module are also possible, and could be used with the techniques discussed herein. The stages are repeated if there are more words in the tuning set (decision point 292). The process ends at end point 304.

Figure 7:
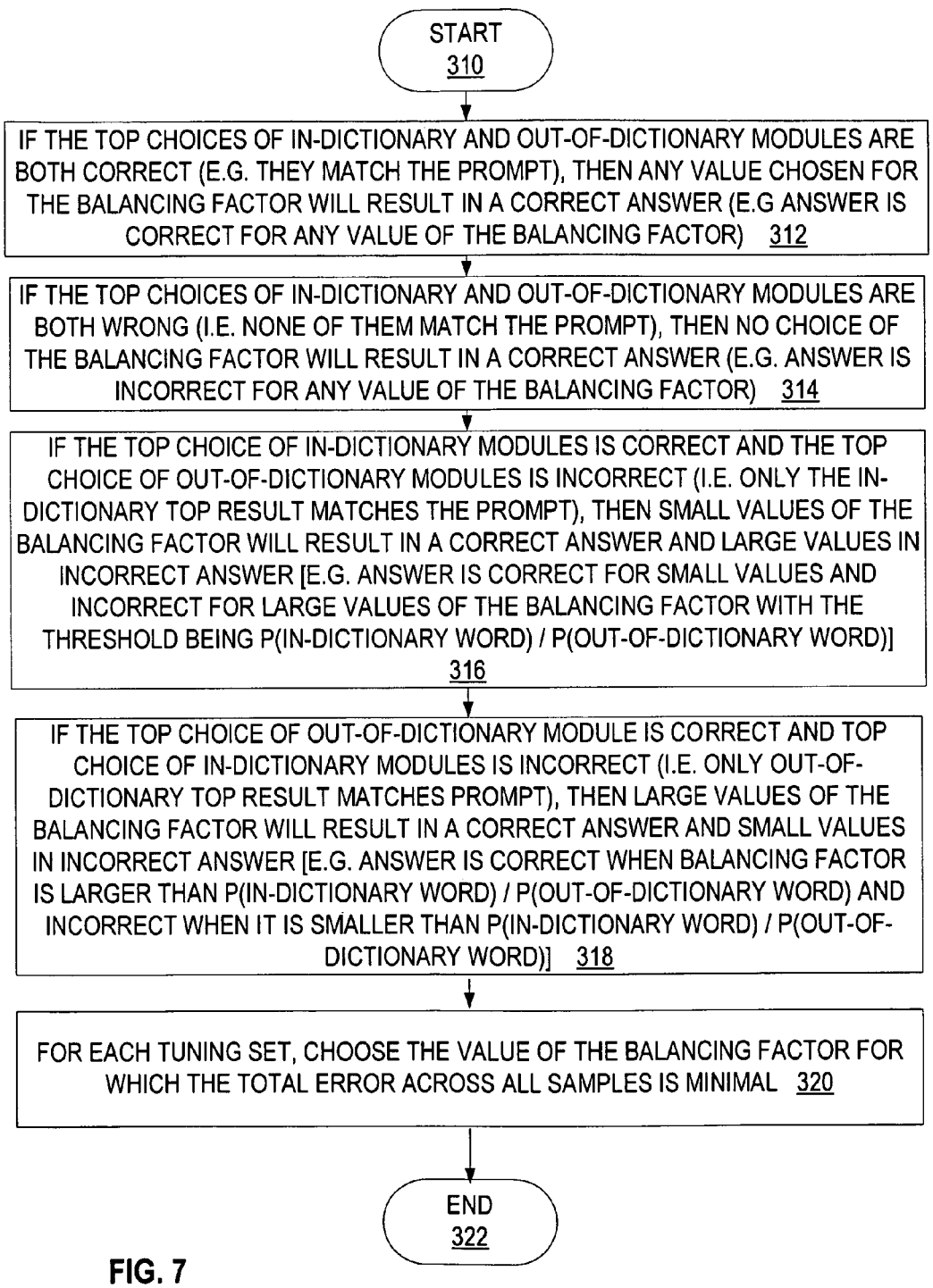
FIG. 7 is a process flow diagram for one implementation of the system of FIG. 1 illustrating the stages involved in choosing the most appropriate balancing factor that can be used to compare in-dictionary and out-of-dictionary scores together.

FIG. 7 is one implementation of the system of FIG. 1 illustrating the stages involved in choosing the most appropriate balancing factor that can be used to compare in-dictionary and out-of-dictionary scores together. In one form, the process of FIG. 7 is at least partially implemented in the operating logic of computing device 600 (of FIG. 9). The procedure begins at start point 310. If the top choices of the in-dictionary and out-of-dictionary modules are both correct (e.g. they match the prompt), then any value chosen for the balancing factor will result in a correct answer (e.g. the answer is correct for any value of the balancing factor) (stage 312). If the top choices of in-dictionary and out-of-dictionary modules are both wrong (i.e. none of them match the prompt), then no choice of the factor will result in a correct answer (e.g. the answer is incorrect for any value of the balancing factor) (stage 314). If the top choice of in-dictionary modules is correct and the top choice of the out-of-dictionary modules is incorrect (i.e. only the in-dictionary top result matches the prompt), then small values of the balancing factor will result in a correct answer and large values in an incorrect answer (stage 316). The answer in this scenario is correct for small values and incorrect for large values of the balancing factor with the threshold being Probability (In-Dictionary Word)/Probability (Out-Of-Dictionary Word) (stage 316).

If the top choice of out-of-dictionary modules is correct and the top choice of in-dictionary modules is incorrect (i.e. only the out-of-dictionary top result matches the prompt), large values of the balancing factor will result in a correct answer and small values in an incorrect answer (stage 318). The answer in this scenario is correct when the balancing factor is larger than the Probability (In-Dictionary Word)/Probability (Out-Of-Dictionary Word) and incorrect when it is smaller than the Probability (In-Dictionary Word)/Probability (Out-Of-Dictionary Word) (stage 318).

For each tuning set, the system chooses the value of the balancing factor for which the total error across all samples is minimal (stage 320). The process ends at end point 322.

Figure 8:
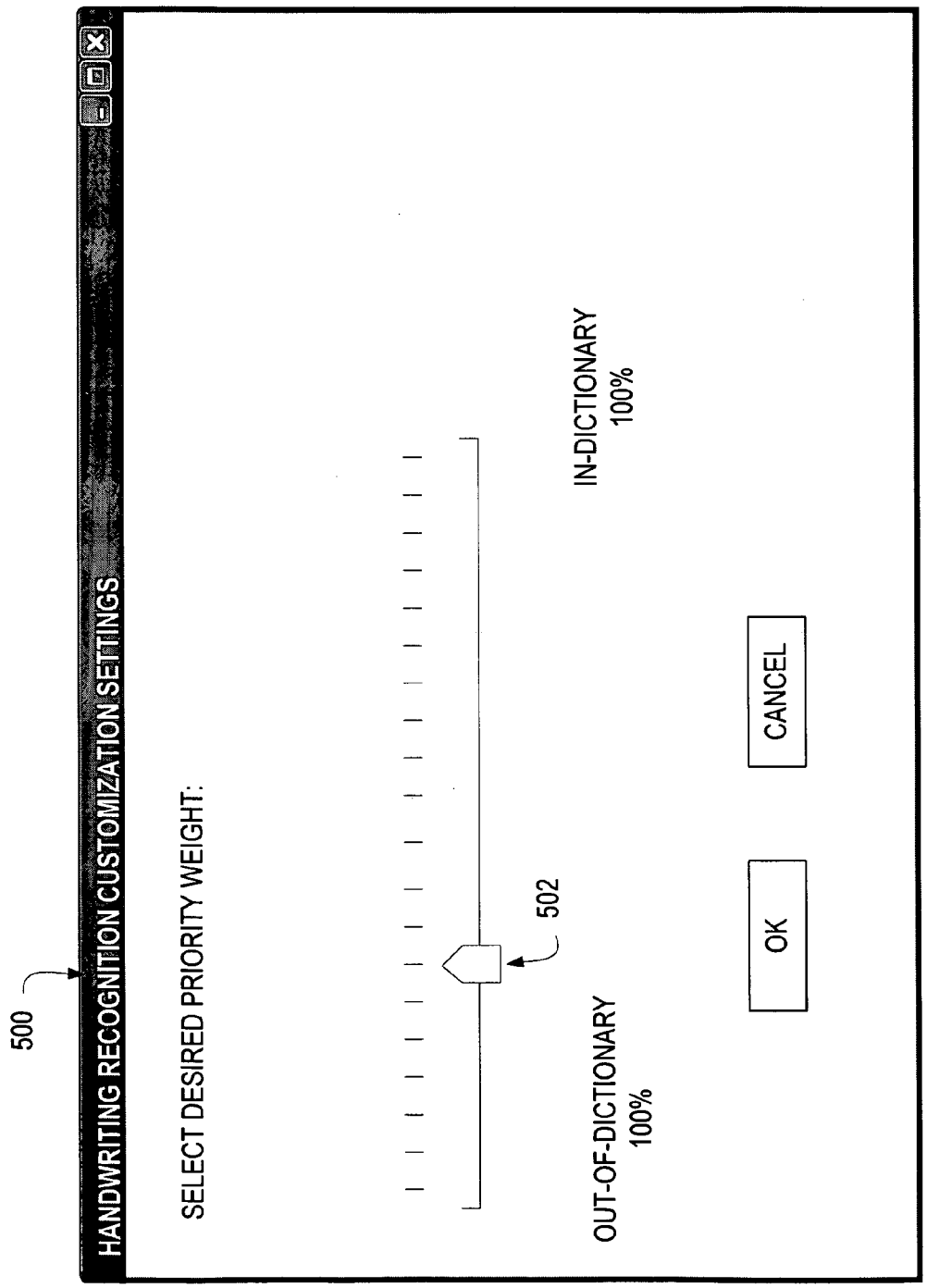
FIG. 8 is a simulated screen for one implementation of the system of FIG. 2 illustrating a user customization screen that allows the user to adjust how the balancing factor is used in recognition operations.

FIG. 8 is a simulated screen 500 for one implementation of the system of FIG. 2 illustrating allowing the user to adjust how the balancing factor is used during recognition operations. A slider bar 502 allows the user to adjust the percentage weight given to the in-dictionary 504 versus the out-of-dictionary modules. The system can then use this user setting to further determine the proper balancing factor to use in comparing in-dictionary recognition scores to out-of-dictionary recognition scores. In one implementation, the system uses one of the pre-computed values for the balancing factor that corresponds to the percentage chosen by the user.

As shown in FIG. 9, an exemplary computer system to use for implementing one or more parts of the system includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 9 by dashed line 606.

Additionally, device 600 may also have additional features/functionality. For example, device 600 may also include additional storage (removable and/or non-removable) including, but not limited to, magnetic or optical disks or tape. Such additional storage is illustrated in FIG. 9 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Computing device 600 includes one or more communication connections 614 that allow computing device 600 to communicate with other computers/applications 615. Device 600 may also have input device(s) 612 such as keyboard, mouse, pen, voice input device, touch input device, etc. Output device(s) 611 such as a display, speakers, printer, etc. may also be included. These devices are well known in the art and need not be discussed at length here. In one implementation, computing device 600 includes either handwriting recognition training application 150 or handwriting recognition application 170. In another implementation, computing device 600 includes both handwriting recognition training application 150 and handwriting recognition application 170. Other variations are also possible.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen layouts, and/or data layouts as described in the examples discussed herein could be organized differently on one or more computers to include fewer or additional options or features than as portrayed in the examples.

What is claimed is:

1. A computer implemented method for generating a second out-of-dictionary recognition score for an out-of-dictionary recognized word for handwriting recognition, comprising:
   analyzing, with a microprocessor, a tuning word to find an in-dictionary tuning word and an out-of-dictionary tuning word that substantially match the tuning word;
   selecting a balancing factor, based on a probability the in-dictionary tuning word and the out-of-dictionary tuning word correctly match the tuning word, comprising one of:
      selecting a value for the balancing factor that is less than a resulting quotient of the probability of the in-dictionary tuning word being correct divided by the probability of the out-of-dictionary tuning word being correct, if the in-dictionary tuning word is correct and the out-of-dictionary tuning word is not correct; and
      selecting a value for the balancing factor that is greater than a resulting quotient of the probability of the in-dictionary tuning word being correct divided by the probability of the out-of-dictionary tuning word being correct, if the in-dictionary tuning word is not correct and the out-of-dictionary tuning word is correct; and
   combining the balancing factor with a first out-of-dictionary recognition score for a word determined, during a recognition process, to be an out-of-dictionary word to generate a second out-of-dictionary recognition score for the out-of-dictionary recognized word.

2. The method of claim 1, comprising comparing the second out-of-dictionary recognition score for the out-of-dictionary recognized word to an in-dictionary recognition score for an in-dictionary recognized word.

3. The method of claim 2, comprising combining a list of recognized in-dictionary words with a list of recognized out-of-dictionary words using the second out-of-dictionary recognition score and the in-dictionary recognition score.

4. The method of claim 3, comprising using the combined list to make a handwriting recognition decision.

5. The method of claim 1, the second out-of-dictionary recognition score comprising a product of the balancing factor and the first out-of-dictionary recognition score.

6. The method of claim 1, the first out-of-dictionary recognition score comprising a combination of a matching probability of the out-of dictionary recognized word and a weak language model probability for the out-of dictionary recognized word.

7. The method of claim 1, comprising providing the tuning word from a set of tuning words.

8. The method of claim 1, comprising receiving user input to adjust the balancing factor.

9. The method of claim 7, comprising randomly generating the set of tuning words.

10. A computer-readable storage media having computer-executable instructions that when executed on a computer via a microprocessor perform a method comprising:
   generating a tuning set from a set of provided correct ink samples of words, the tuning set comprising at least some in-dictionary words and a number of out-of-dictionary words, the number of out-of-dictionary words determined by a percentage of out-of-dictionary words expected for a typical user;
   running a handwriting recognizer against the tuning set to determine a set of statistics for a plurality of words in the tuning set, the set of statistics based at least in part upon a probability that a word from the tuning set matches a correct answer; and
   calculating a balancing factor based on the set of statistics for use in comparing an in-dictionary recognition score with an out-of-dictionary recognition score in a recognition operation, comprising one of:
      selecting a value for the balancing factor that is less than a resulting quotient of a probability of an in-dictionary tuning word being correct divided by a probability of an out-of-dictionary turning word being correct, if the in-dictionary tuning word is correct and the out-of-dictionary tuning word is not correct; and
      selecting a value for the balancing factor that is greater than a resulting quotient of the probability of the in-dictionary tuning word being correct divided by the probability of the out-of-dictionary tuning word being correct, if the in-dictionary tuning word is not correct and the out-of-dictionary tuning word is correct.

11. The computer-readable media of claim 10, the method comprising generating the tuning set randomly.

12. The computer-readable media of claim 10, the method comprising determining the percentage of out-of-dictionary words expected for the typical user.

13. A computing device for handwriting recognition, comprising:
   one or more processors; and
   a computer readable storage medium comprising computer executable instructions that when executed by the one or more processors perform operations comprising:
      segmenting handwritten input from a user into a plurality of segments;
      determining a set of matching probabilities for at least a portion of the segments;
      generating an in-dictionary alternate list comprising a plurality of in-dictionary recognition scores;
      generating an out-of-dictionary alternate list comprising a plurality of out-of-dictionary recognition scores;
      calculating a balancing factor using a tuning set comprising in-dictionary tuning words and out-of-dictionary tuning words, the calculating comprising one of:

selecting a first value for the balancing factor that is less than a resulting quotient of a first probability of an in-dictionary tuning word being correct divided by a second probability of an out-of-dictionary tuning word being correct, if the in-dictionary tuning word is correct and the out-of-dictionary tuning word is not correct; and selecting a second value for the balancing factor that is greater than a resulting quotient of a third probability of the in-dictionary tuning word being correct divided by a fourth probability of the out-of-dictionary tuning word being correct, if the in-dictionary tuning word is not correct and the out-of-dictionary tuning word is correct;

comparing the in-dictionary alternate list with the out-of-dictionary alternate list using the balancing factor;

combining the in-dictionary alternate list and the out-of-dictionary alternate list, based on the comparison of the in-dictionary alternate list with the out-of-dictionary alternate list, to create a combined alternate list; and making a final recognition decision regarding the handwritten input using the combined alternate list.

14. The method of claim 13, comprising displaying one or more characters representing the final recognition decision to the user.

15. The method of claim 13, comprising multiplying the balancing factor by the respective out-of-dictionary recognition scores to generate corresponding revised out-of-dictionary recognition scores.

* * * * *